US006765546B2

(12) United States Patent
Akamine et al.

(10) Patent No.: US 6,765,546 B2
(45) Date of Patent: Jul. 20, 2004

(54) DISPLAY DEVICE

(75) Inventors: Hatsushi Akamine, Shizuoka (JP);
Yoshiyuki Iwamoto, Shizuoka (JP);
Yasuhiro Nagasaka, Aichi (JP)

(73) Assignee: Yazaki Corporation, Tokyo (JP)

( * ) Notice: Subject to any disclaimer, the term of this patent is extended or adjusted under 35 U.S.C. 154(b) by 143 days.

(21) Appl. No.: 09/861,884

(22) Filed: May 22, 2001

(65) Prior Publication Data

US 2002/0054440 A1 May 9, 2002

(30) Foreign Application Priority Data

May 23, 2000 (JP) .................................... P.2000-151898

(51) Int. Cl.⁷ ................................................ G09G 3/00
(52) U.S. Cl. .......................... 345/55; 345/43; 345/72; 340/988; 349/110; 349/111
(58) Field of Search ................. 345/30, 32, 72, 345/43, 55, 87–104; 340/988, 990; 248/917, 918; 361/1; 349/104–111

(56) References Cited

U.S. PATENT DOCUMENTS

| | | | | |
|---|---|---|---|---|
| 5,638,084 A | * | 6/1997 | Kalt ............................ | 345/31 |
| 5,644,860 A | * | 7/1997 | Piper et al. .................... | 40/579 |
| 5,724,062 A | * | 3/1998 | Hunter ........................ | 345/102 |
| 5,736,278 A | * | 4/1998 | Nakazawa et al. ........... | 430/321 |
| 6,060,982 A | * | 5/2000 | Holtrop ....................... | 340/432 |
| 6,606,137 B2 | * | 8/2003 | Lee ............................ | 349/106 |

FOREIGN PATENT DOCUMENTS

| | | | |
|---|---|---|---|
| DE | 296 22 671 U1 | 7/1997 | |
| DE | 196 40 549 A1 | 4/1998 | |
| GB | 2 243 013 A | 10/1991 | |
| JP | 7-52519 | 2/1995 | ............ B41M/3/06 |
| JP | 7-186513 | 7/1995 | ............ B41M/3/06 |
| JP | 09-330487 | * 12/1997 | |
| JP | 9-330487 | 12/1997 | ........... G08B/13/22 |
| JP | 11-134960 | * 5/1999 | |

OTHER PUBLICATIONS

Patent Abstract of Japan, 07–052519, Feb. 28, 1995.
Patent Abstract of Japan, 07–186513, Jul. 25, 1995.
Patent Abstract of Japan, 09–330487, 21/22/97.

* cited by examiner

*Primary Examiner*—Lun-Yi Lao
(74) *Attorney, Agent, or Firm*—Sughrue Mion, PLLC

(57) ABSTRACT

In a vehicle display device having displays fitted in a grained panel of an instrument panel of a vehicle and serving to emit a display light to an outside during lighting, a front face of each of the displays is covered with a screen having a grained pattern which is provided with a large number of minute holes capable of transmitting the display light. Consequently, a screen can be seen through the minute holes of the screen when the display is turned on, while the display is hidden by the grained screen when the display is turned off. Therefore, the whole portion including the part having the display fitted therein is unified to be grained.

3 Claims, 4 Drawing Sheets

FIG. 2
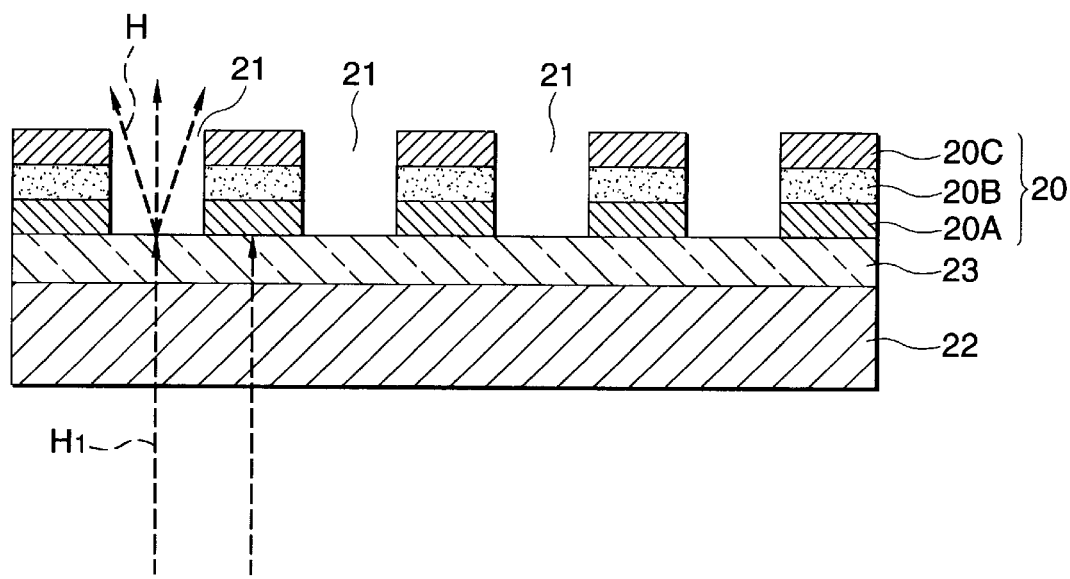
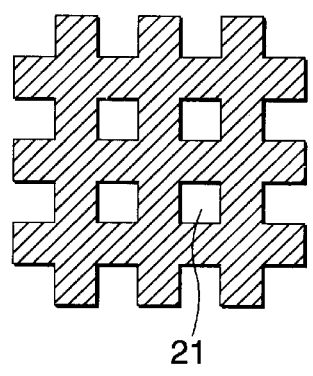
FIG. 3A
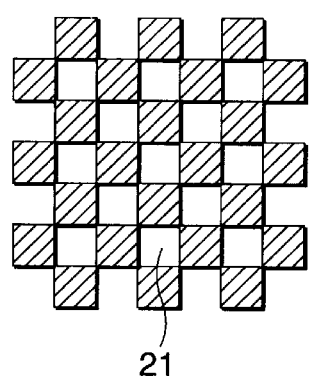
FIG. 3B
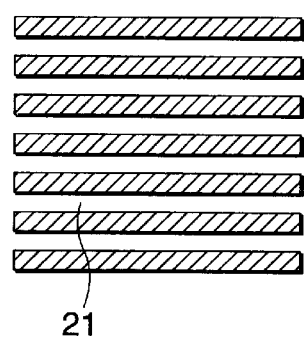
FIG. 3C

DISPLAY DEVICE

BACKGROUND OF THE INVENTION

1. Technical field of the Invention

The present invention relates to a display device for providing necessary visual information by a display during use and for pretending to have no display during nonuse.

2. Related Art

Currently, a large-sized display 1 is generally provided in the central part of an instrument panel 2 or thereon as shown in FIGS. 4A and 4B in order to provide information to a driver.

However, while the display is convenient when car navigation information is used, the presence of the display becomes an obstacle during nonuse because it is particularly large-sized and the appearance of the periphery of the instrument panel is damaged.

SUMMARY OF THE INVENTION

In consideration of such circumstances, the invention has an object to provide a display device capable of giving necessary visual information by means of a display during use and of pretending to have no display during nonuse.

A first aspect of the invention is directed to a display device having a display fitted in an attached portion and serving to emit a display light to an outside during lighting, wherein a front face of the display is covered with a screen having a large number of minute holes capable of transmitting the display light and a surface of the screen is set to have the same color and pattern as those of the attached portion on a periphery of the display.

In the display device according to the invention, the display provided on the back of the screen is turned on during use. Therefore, the display light of the display is transmitted forward through the minute hole of the screen. Accordingly, the image of the display can be seen through the screen. At this time, the color and pattern of the screen cannot be seen due to the brightness of the display light transmitted through the minute hole. Therefore, the presence of the screen does not become a visual obstacle.

Moreover, the display is turned off during the nonuse. Therefore, the back of the screen becomes dark so that the display cannot be seen from the front of the screen. The light is not transmitted from the back, Therefore, the color and pattern on the surface of the screen can be seen clearly. Consequently, the attached portion provided around the display and the screen can be unified and seen with the same color and pattern.

A second aspect of the invention is directed to the display device according to the first aspect of the invention, wherein the surface of the screen is set to have the same grained color and pattern as those of the attached portion on the periphery of the display.

In the display device according to the invention, the color and pattern on the surface of the screen are unified to be grained in the same manner as the color and pattern of the attached portion on the periphery. Therefore, when the display is turned off, the whole attached portion can be seen to be grained including the portion where the display is fitted. In particular, the color and the pattern are grained. Therefore, a boundary between the screen on the front face of the display and the attached portion on the periphery can be visually blurred as compared with the case of a single color. Thus, a sense of unification can be wholly enhanced.

Moreover, in the case in which the screen has a white based color and pattern and the display is turned off so that the back becomes dark, only that portion has a dark tone so that a sense of incompatibility might be given. However, since the grained tone is used, the tone can be prevented from sinking even if the back becomes dark. Thus, a difference in a tone from the attached portion on the periphery can be reduced to lessen the sense of incompatibility.

A third aspect of the invention is directed to the display device according to the second aspect of the invention, wherein the screen has a three-layered structure in which a black layer, a white layer and a grained layer formed by printing are printed from a lower layer to an upper layer in order.

In the display device according to the invention, the black layer is provided in the lower layer portion of the screen and the grained layer is provided thereon through the white layer. Therefore, when the display is turned on, the black layer acts as a mask and serves to block the transmission of the display light of the display. During the use of the display, accordingly, it is possible to more reliably prevent the grained portion from being seen. Thus, it is possible to prevent the presence of the screen from being found. Moreover, when the display is turned off, the white layer provided under the grained layer serves to increase a white level during exposure to an external light. Therefore, the brown color of the grained tone can look better and the grained pattern can look clear.

BRIEF DESCRIPTION OF THE DRAWINGS

FIGS. 3A, 3B and 3C are diagrams showing a formation pattern of a minute hole of the screen to be used for the display device.

DETAILED DESCRIPTION OF PREFERRED EMBODIMENT

An embodiment of the invention will be described below with reference to the drawings. In the embodiment, the invention is applied to a display device having a display which is fitted in an interior panel of a vehicle and serves to emit a display light to the outside during lighting.

Figure 1A:
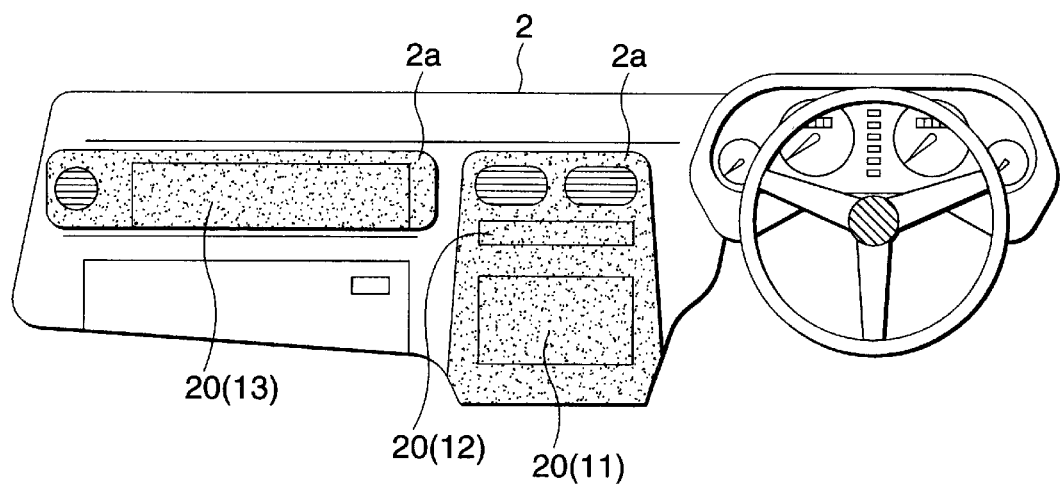
FIGS. 1A and 1B are front views showing the inside of a vehicle having a display device according to an embodiment of the invention mounted thereon as seen from a front seat, FIG. 1A showing a state in which a display is turned off and FIG. 1B showing a state in which the display is turned on, FIG. 2 is an enlarged sectional view showing a screen to be used for the display device.
Figure 1B:
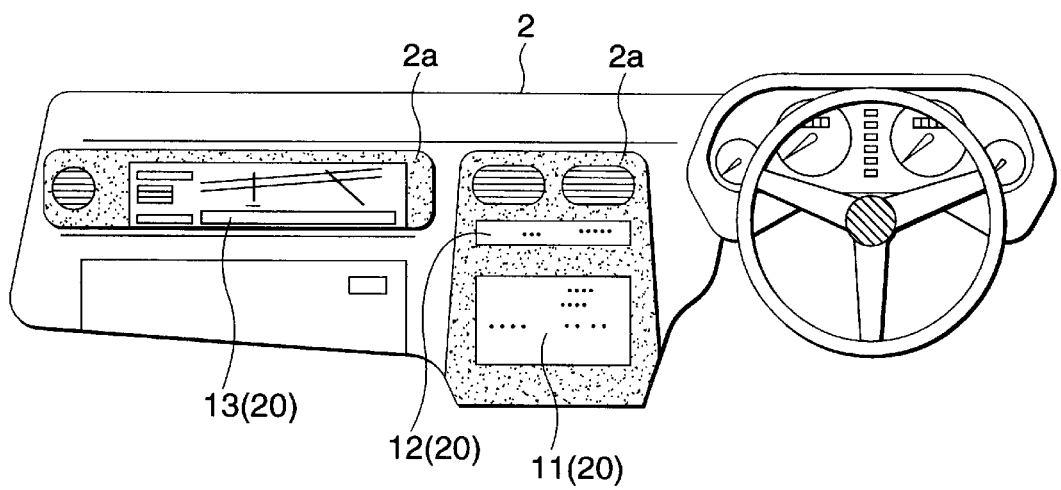

FIGS. 1A and 1B are front views showing the inside of the vehicle having the display device according to the embodiment mounted thereon as seen from a front seat, FIG. 1A showing a state in which the display is turned off and FIG. 1B showing a state in which the display is turned on.

A grained panel 2a having a grained decoration is provided in the central part of an instrument panel 2 and the front part of a passenger seat. A display 11 of a first display device and a display 12 of a second display device are fitted in the grained panel 2a in the central part and a display 13 of a third display device is fitted in the grained panel 2a provided in front of the passenger seat.

These displays 11, 12 and 13 have a back light source provided therein and are controlled to emit a display light to the outside, thereby providing image information to a passenger. The front face of each of the displays 11, 12 and 13 is covered with a screen 20 which is printed to have the same grained color and pattern as the grained panel 2a on the periphery.

The screen 20 has a large number of minute holes 21 capable of transmitting a display light H as is enlarged in FIG. 2, and is formed by printing over the surface of a smoke plate 23 provided on a diffusion plate 22 of each of the displays 11, 12 and 13. More specifically, the screen 20 is formed to have a three-layered structure of a black layer 20A, a white layer 20B and a grained layer 20C by applying black printing, white printing and grain printing on the uppermost layer over the smoke plate 23 in this order.

Next, action will be described.

During the use of the displays 11, 12 and 13, the back light sources of the displays 11, 12 and 13 which are provided on the back of the screen 20 are turned on so that an incident light H1 transmitted forward forms an image on the diffusion plate 22 and the display light H to be a diffused light is transmitted forward from the minute holes 21 of the screen 20 through the smoke plate 23 (see FIG. 2). As shown in FIG. 1B, accordingly, the images of the displays 11, 12 and 13 can be seen through the minute holes 21 of the screen 21 in a forward direction. In this case, a contrast is enhanced through the smoke plate 23 and an image is formed on the screen 20.

At this time, the color and pattern of the screen 20 cannot be seen due to the brightness of the display light H transmitted from the minute holes 21. Therefore, the presence of the screen 20 is not a visual obstacle and cannot be found so that the images formed on the displays 11, 12 and 13 can be seen.

In particular, the black layer 20A is provided in the lower layer portion of the screen 20. Therefore, when the displays 11, 12 and 13 are turned on, the black layer 20A acts as a mask and serves to block the transmission of the display light H of the displays 11, 12 and 13. During the use of the displays 11, 12 and 13, accordingly, it is possible to more reliably prevent the grained portion from being seen and to prevent the presence of the screen 20 from being found.

During nonuse, moreover, the back light sources of the displays 11, 12 and 13 are turned off so that the back of the screen 20 becomes dark. As shown in FIG. 1A, therefore, the displays 11, 12 and 13 cannot be seen in the forward direction of the screen 20. Since the light transmission from the back is eliminated, the grained color and pattern on the surface of the screen 20 can be seen clearly so that the grained panel 2a and the color and pattern on the periphery of the displays 11, 12 and 13 can be seen to be unified.

In particular, when the displays 11, 12 and 13 are turned off, the white layer 20B provided under the grain layer 20C serves to increase a white level during exposure to an external light. Therefore, the brown color of the grain can look better and the pattern of the grain can clearly come rise to the surface. Moreover, since the color and the pattern are grained, it is also possible to produce the effect that the boundary between the screen 20 and the grained panel 2a can be blurred visually as compared with the case of a single color. Furthermore, in the case in which the screen 20 has a white based color and pattern and the displays 11, 12 and 13 are turned off so that the back becomes dark, only that portion has a dark tone so that a sense of incompatibility might be given. However, the grain can prevent a tone from sinking even if the back becomes dark. Thus, it is possible to lessen a difference in the tone from the grained panel 2a on the periphery, thereby reducing the sense of incompatibility.

More specifically, the displays 11, 12 and 13 are hidden by the same grained screen 20 as that on the periphery. Therefore, the appearance of the periphery of the instrument panel 2 can be prevented from being damaged.

The formation pattern of the minute hole 21 of the screen 20 can be set to be grid-shaped as shown in FIG. 3A, to be checked as shown in FIG. 3B and to be stripe-shaped as shown in FIG. 3C.

While the specific embodiment to which the invention is applied has been described above, the invention is not restricted to the embodiment but can be modified variously. For example, while the display device according to the invention is fitted in the interior panel of the vehicle in the embodiment, the same effects as those of the embodiment shown in FIGS. 1 to 3 can be obtained even if the display device according to the invention is fitted in inner and outer walls or furniture of a house.

Figure 4A:
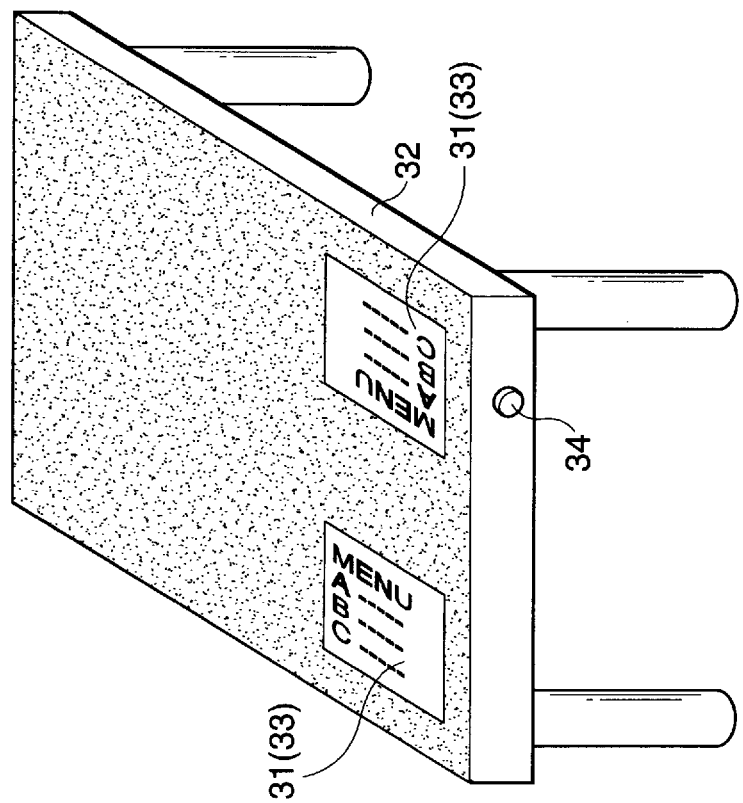
FIG. 4A and FIG. 4B are perspective views showing examples in which the display device according to the invention is applied to a table.
Figure 4B:
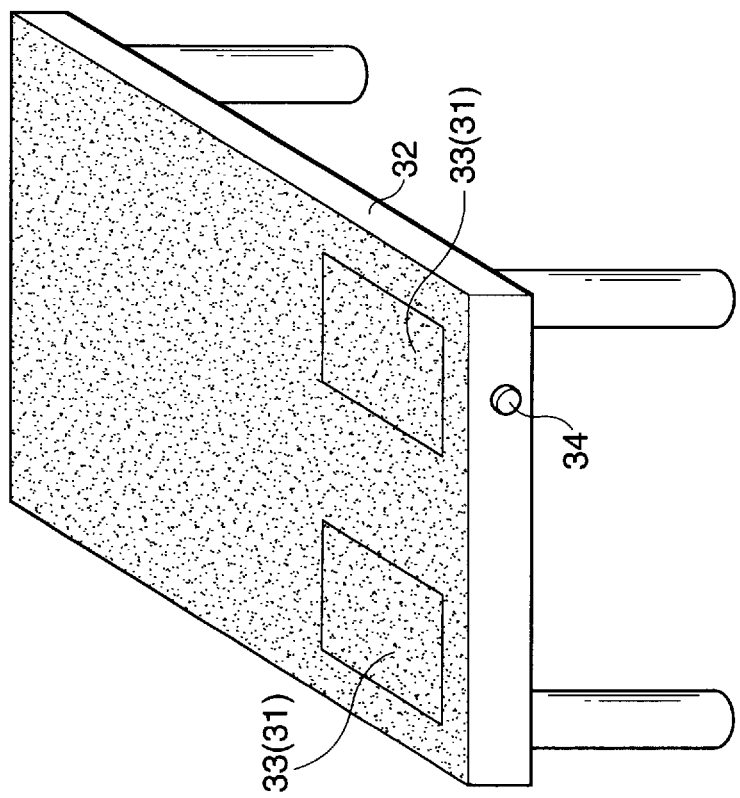
Figure 5A:
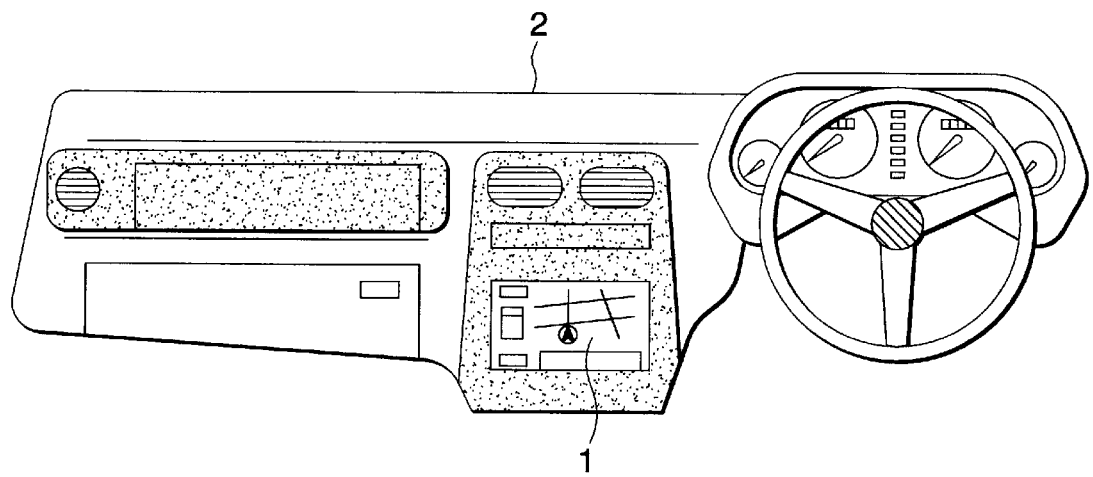
FIGS. 5A and 5B are front views showing the inside of a vehicle having a related display device mounted thereon as seen from a front seat, FIG. 5A showing an example in which a display is fitted in an instrument panel and FIG. 5D showing an example in which the display is provided on the instrument panel.
Figure 5B:
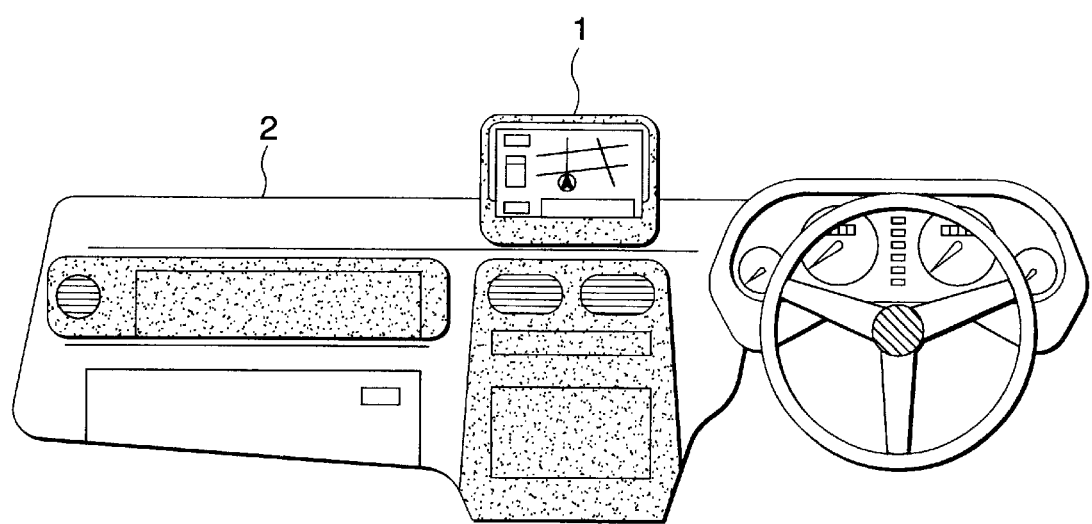

By way of example, as shown in FIGS. 4A & 4B, a display 31 for displaying a menu which is to be used in a restaurant may be fitted in the attached portion of a table 32 and the front face of the display 31 may be covered with a screen 33 having a large number of minute holes which can transmit a display light. The screen 33 has the same structure as that of the screen 20 according to the embodiment and has the same color (including a grain) and pattern as those of the table 32.

In the display device, as shown in FIG. 4A, the display 31 is usually hidden by the same grained screen 33 as the periphery so that the appearance of the table 32 is not damaged, for example. When a display lighting switch 34 provided on the side face of the table 32 is pushed, a menu displayed on the display 31 can be seen as shown in FIG. 4B.

What is claimed is:

1. A display device comprising:

a display fitted in an attached portion and emitting a display light to an outside during lighting;

a screen covering a front face of the display having a large number of minute holes capable of transmitting the display light, wherein a surface of the screen has a same color and pattern as those of the attached portion on a periphery of the display, wherein the surface of the screen has a same grained color and pattern as those of the attached portion of the periphery of the display, and wherein the screen has a three-layered structure in which a black layer, a white layer and a grained layer formed by printing are printed from a lower layer to an upper layer in order.

2. A display device comprising:

a display fitted in an attached portion and emitting a display light to an outside during lighting;

a screen covering a front face of the display having a large number of minute holes capable of transmitting the display light, wherein a surface of the screen has a same color and pattern as those of the attached portion on a periphery of the display wherein the display comprises a diffusion plate; and further comprising a smoke plate disposed between the diffusion plate and the screen.

3. A display device comprising:

a display fitted in an attached portion and emitting a display light to an outside during lighting;

a layered screen covering a front face of the display having a large number of minute openings, wherein a surface of the screen has a same color and pattern as a surface of the attached portion at a periphery of the display, wherein the layered screen comprises a black lower layer, a white middle layer and a patterned upper layer.

* * * * *